(12) United States Patent
Harley et al.

(10) Patent No.: US 7,558,478 B1
(45) Date of Patent: Jul. 7, 2009

(54) PRECONFIGURING COMPENSATION OF OPTICAL PATH IMPAIRMENTS

(75) Inventors: James Harley, Nepean (CA); Kim B. Roberts, Nepean (CA); Michel Belanger, Montreal (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 568 days.

(21) Appl. No.: 11/362,912

(22) Filed: Feb. 28, 2006

Related U.S. Application Data

(60) Provisional application No. 60/656,368, filed on Feb. 28, 2005.

(51) Int. Cl.
*H04B 10/08* (2006.01)
*H04B 10/00* (2006.01)

(52) U.S. Cl. .............................. 398/25; 398/28; 398/29; 398/158; 398/159

(58) Field of Classification Search .................... 398/25, 398/29, 33, 28, 13, 14, 20, 22, 23, 24, 34, 398/81, 147, 158, 159
See application file for complete search history.

(56) References Cited

U.S. PATENT DOCUMENTS 7,277,648 B2 * 10/2007 Lanne et al. ................ 398/198

* cited by examiner

*Primary Examiner*—M. R. Sedighian
(74) *Attorney, Agent, or Firm*—Kent Daniels; Blake, Cassels & Graydon LLP

(57) ABSTRACT

A method of controlling optical signal traffic in an optical network between a transmitter and a plurality of receivers, where the transmitter is adapted to compensate optical impairments based on at least one optical parameter, includes steps of identifying each path between the transmitter and the plurality of receivers, determining a respective optical parameter for each path, selecting one of the receivers for receiving an optical signal from the transmitter, and enabling the transmitter to generate the optical signal using the respective optical parameter of the path between the transmitter and the selected receiver. By preconfiguring compensation parameters for the various paths in the network, an all-optical network can be implemented wherein optical signals can be switched, added or dropped without having to match dispersion maps or perform optical-electrical-optical regeneration.

18 Claims, 4 Drawing Sheets

PRECONFIGURING COMPENSATION OF OPTICAL PATH IMPAIRMENTS

CROSS-REFERENCE TO RELATED APPLICATIONS

This application claims priority under 35 U.S.C. §119(e) from U.S. Provisional Patent Application No. 60/656,368 entitled "Optical Signal Transmitter Systems With Electronic Precompensation" which was filed on Feb. 28, 2005.

MICROFICHE APPENDIX

Not Applicable.

TECHNICAL FIELD

The present invention relates to optical communications systems and, in particular, to electrical domain compensation of dispersion or other optical path impairments.

BACKGROUND OF THE INVENTION

FIG. 1a schematically illustrates an optical transmitter 2 connected to an optical receiver 4 via an all-optical path 6. A plurality of optical amplifiers 8 and dispersion compensator modules (DCMs) 10 can be installed along the path in order to increase signal reach. Without these DCMs, dispersion would rise as shown by the dashed line 12 in the accompanying dispersion profile. By inserting DCMs, a parabolic dispersion profile 14 can be achieved, which maximizes signal reach with this type of system.

However, in order to perform optical switching (or adding or dropping of wavelengths), the dispersion compensation of the optical path must follow a suitable compensation profile, which enables optical connection of multiple paths together and allowing wavelengths to be exchanged across the multiple paths. However, the adoption of such a dispersion profile reduces the overall available system margin, thus reducing the optical signal reach. For example, consider the simple schematic network shown in FIG. 1b having four nodes 20 and an optical switch (or cross-connect) 22. While dispersion can be compensated for paths A-B and C-D in an ideal method, if an optical signal on path A-B is to be switched onto path C-D, the dispersion profiles of paths A-B and C-D must enable this optical interconnection at the switch 22. This has for effect of reducing the signal reach along paths A-B and C-D One prior-art solution to this problem is simply to shorten each link and regenerate the optical signal at the cross-connect 22 by performing optical-electrical-optical (OEO) regeneration, which diminishes overall system performance.

Another prior-art solution is to use dispersion compensation modules to reduce the dispersion to zero at the end of every span (as shown by dashed line 16 in FIG. 1a), thus increasing the number of locations where optical switching can be performed. However, this arrangement severely compromises signal reach.

Although some degree of control over the dispersion profile of an optical link can be achieved using adaptive dispersion compensation modules, these adaptive DCMs only control dispersion over a limited range.

Digital electrical-domain pre-compensation of optical signals is described in Applicant's co-pending U.S. patent applications Ser. Nos. 10/262,944, filed Oct. 3, 2002; 10/307,466 filed Dec. 2, 2002; and 10/405,236 filed Apr. 3, 2003; and International Patent Application No. PCT/CA03/01044 filed Jul. 11, 2003. These co-owned patent applications, the contents of which are hereby incorporated by reference, describe techniques for compensating both linear and nonlinear impairments in an optical path by pre-distorting an input signal x(t), in the electrical domain, and then using the thus predistorted signal to drive an optical modulator. Because compensation is implemented in the electrical domain, virtually any arbitrary compensation function can be implemented. This enables dispersion (and other optical impairments) to be compensated, without requiring optical dispersion compensation modules (DCMs) within the path. Elimination of DCMs has the additional advantage that it reduces the system gain required to obtain a desired signal reach, thereby enabling fewer (or lower performance) amplifiers. Furthermore, electrical-domain compensation facilitates system evolution, because changes in path equipment and/or performance parameters can readily be accommodated through suitable adjustment of the compensation function.

As illustrated schematically in FIG. 2, an optical transmitter 100 is adapted to perform electrical-domain pre-compensation of optical signals by pre-distorting an electrical signal which, when converted to a corresponding optical signal and transmitted through an optical path, substantially mitigates optical impairments incurred over the path. Within the optical transmitter 100 is a complex driver 102 which includes a signal processor (not shown) which receives the input data signal x(t), e.g. a digital data stream, and uses a compensation function C[ ] to compute successive multi-bit in-phase and quadrature values representing successive loci of the endpoint of a desired or target optical E-field vector. The complex driver 102 also includes a linearizer (not shown) which uses the multi-bit loci to synthesize a pair of multi-bit digital drive signals which are then converted into analog (RF) signals by respective high-speed multi-bit Digital-to-Analog Converters (DACs), such as the DACs described in U.S. Pat. No. 6,781,537 entitled "High Speed Digital To Analog Converter", the contents of which are hereby incorporated by reference. The analog signals are then amplified and optionally band-pass filtered to generate the drive signals supplied to an E/O converter 104 (e.g. a Mach-Zehnder interferometer). The digital drive signals are computed such that the drive signals supplied to the E/O converter 104 generates an optical E-field $E_0(t)$ that is a high-fidelity reproduction of the target E-field computed by the signal processor of the complex driver 102.

In general, the complex driver 102 is capable of implementing any desired mathematical function, which means that the compensation function C[ ] can be selected to compensate any desired signal impairments, including, but not limited to, dispersion, Self-Phase Modulation (SPM), Cross-Phase Modulation (XPM), four-wave mixing and polarization dependent effects (PDEs) such as polarization dependent loss. In addition, the compensation function C[ ] can be dynamically adjusted for changes in the optical properties of the path, and for component drift due to aging.

To establish a pre-compensated connection over a new path, however, requires that the optical parameters or characteristics for the new path be known in advance (i.e. measured and/or computed before the new connection is established). This is problematic when attempting to swiftly establish a new optical connection ("at-speed"), i.e. in an interval of tens or hundreds of milliseconds.

Thus, it remains highly desirable to be able to quickly establish a new connection over a pre-compensated optical path.

SUMMARY OF THE INVENTION

An object of the present invention is to provide a method of quickly establishing a new connection over a pre-compensated optical path.

Accordingly, an aspect of the present invention provides a method of configuring an optical signal in an optical network between a transmitter and a plurality of receivers, the transmitter being adapted to compensate optical impairments based on at least one optical parameter. The method includes steps of identifying optical path between the transmitter and the plurality of receivers, determining a respective optical parameter for each path, selecting one of the receivers for receiving an optical signal from the transmitter, and enabling the transmitter to generate the optical signal using the respective optical parameter of the path between the transmitter and the selected receiver.

Another aspect of the present invention provides an agile all-optical network having a plurality of optical network nodes interconnected by optical links to define optical paths through the network. The network includes an optical transmitter at one of the nodes, the transmitter being adapted to pre-compensate an optical signal based on at least one optical parameter that compensates for at least dispersion, and a storage medium for storing the at least one parameter for each of a plurality of optical paths in the network, the at least one parameter being available to the transmitter to enable the transmitter to pre-compensate the optical signal for a selected optical path.

The parameters can be determined at start-up, either by discovering (measuring) optical characteristics of the path or by calculating compensation parameters based on theoretical optical properties of all links in the path. The compensation parameters can be recomputed periodically based on a feedback signal from the receiver. By pre-determining compensation parameters for a plurality of optical paths in the network, an all-optical network can be pre-configured. In other words, an optical signal can be optically switched without the need for OEO (optical-electrical-optical) regeneration or without the need to match dispersion.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1A:
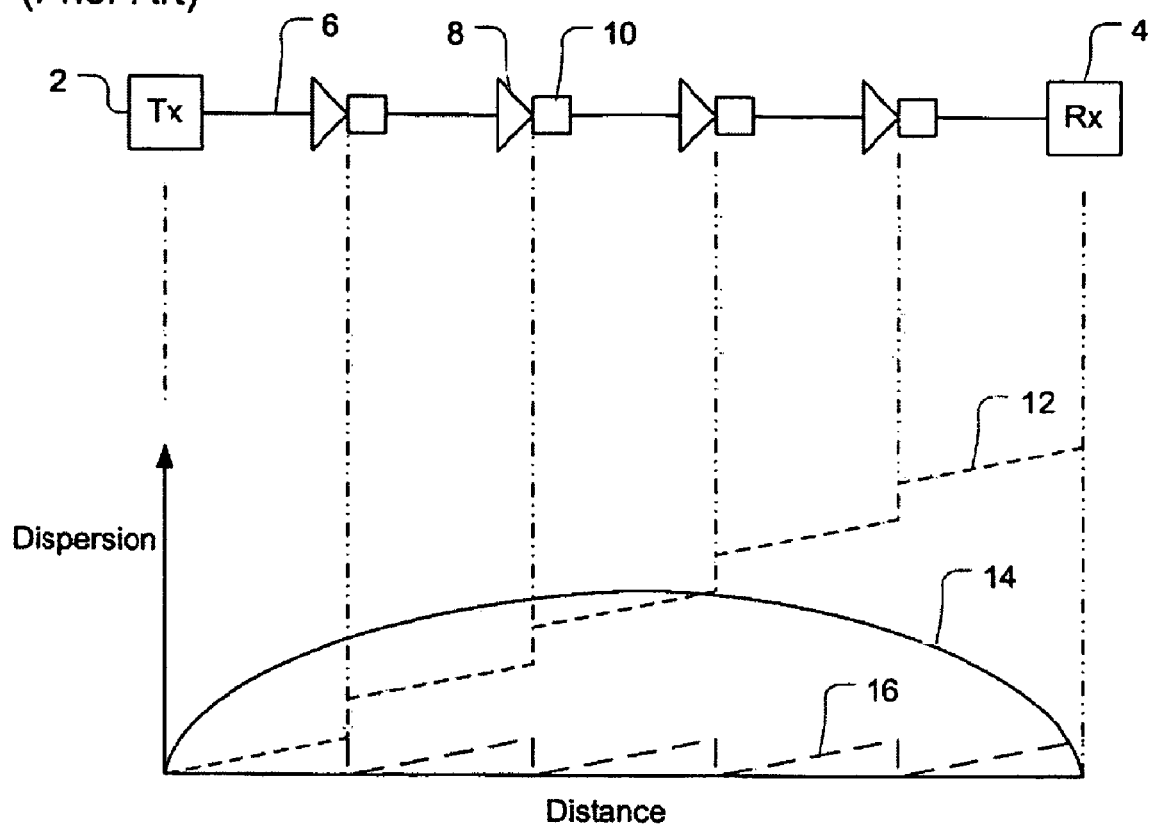
FIG. 1a is a schematic illustration of a prior-art optical link accompanied by a dispersion map showing different dispersion profiles for the link.
Figure 1B:
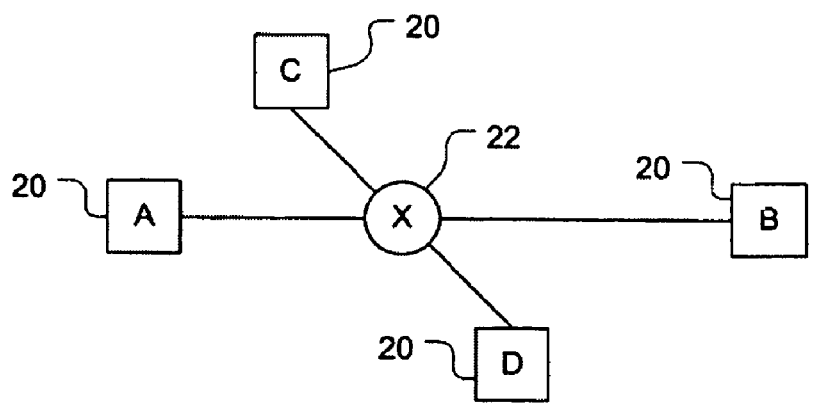
FIG. 1b is a schematic illustration of an optical network having four nodes interconnected by an optical switch.
Figure 2:
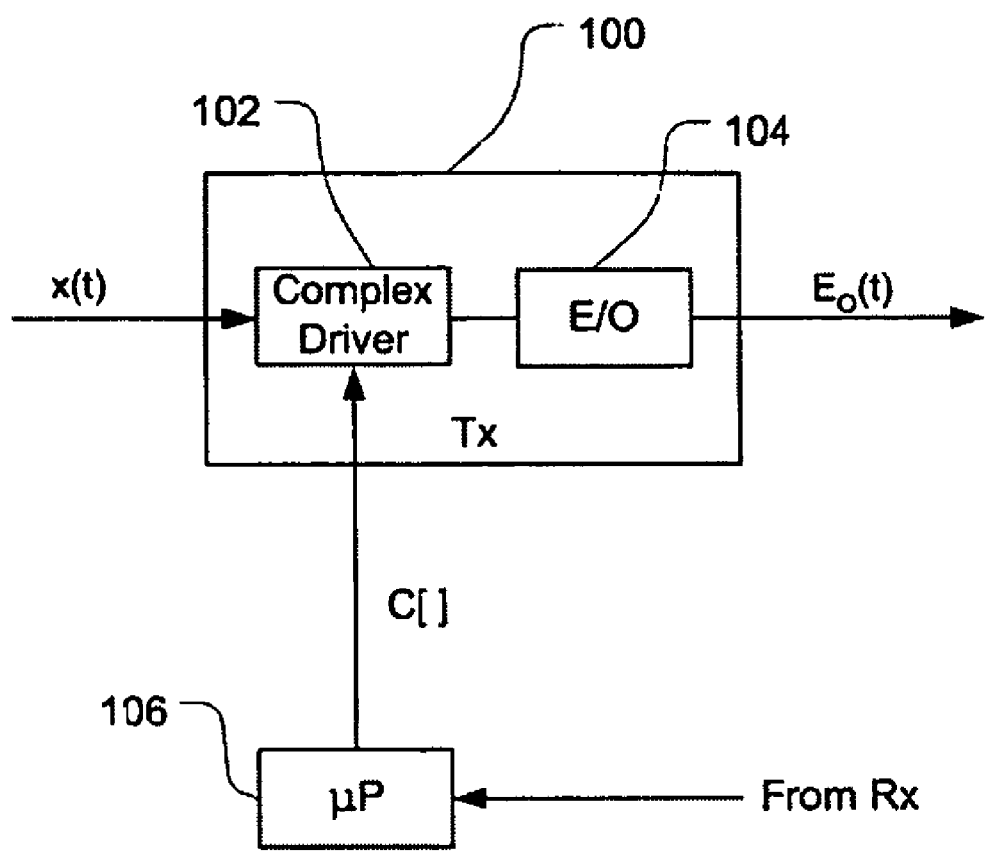
FIG. 2 is a schematic illustration of an optical transmitter adapted to pre-compensate optical impairments by computing compensation parameters based on a feedback signal from a receiver.

The present invention provides a method of controlling optical signal traffic in an agile, all-optical network between a transmitter and a plurality of receivers. In general, the present invention leverages the capabilities of the transmitter described above with reference to FIG. 2, and in Applicant's co-pending U.S. patent applications Ser. Nos. 10/262,944; 10/307,466; and 10/405,236; and International Patent Application No. PCT/CA03/01044. Thus, an agile, all-optical network can be formed of multiple optical links interconnected by all-optical cross-connects. Optical add-drop multiplexers (OADMs) can be provided at any required location(s) within the network. Within this network, optical traffic can be controlled by defining paths through the network between a transmitter and each one of a plurality of receivers, and determining respective optical parameters of each path. During run-time, supplying the appropriate optical parameter(s) to the transmitter enables successful signal transmission through any desired path, independently of the dispersion profiles of the involved links.

For the purposes of this specification, an optical path may include one or more optical links.

Representative embodiments of the present invention are described below with reference to FIGS. 3 to 4.

Figure 3:
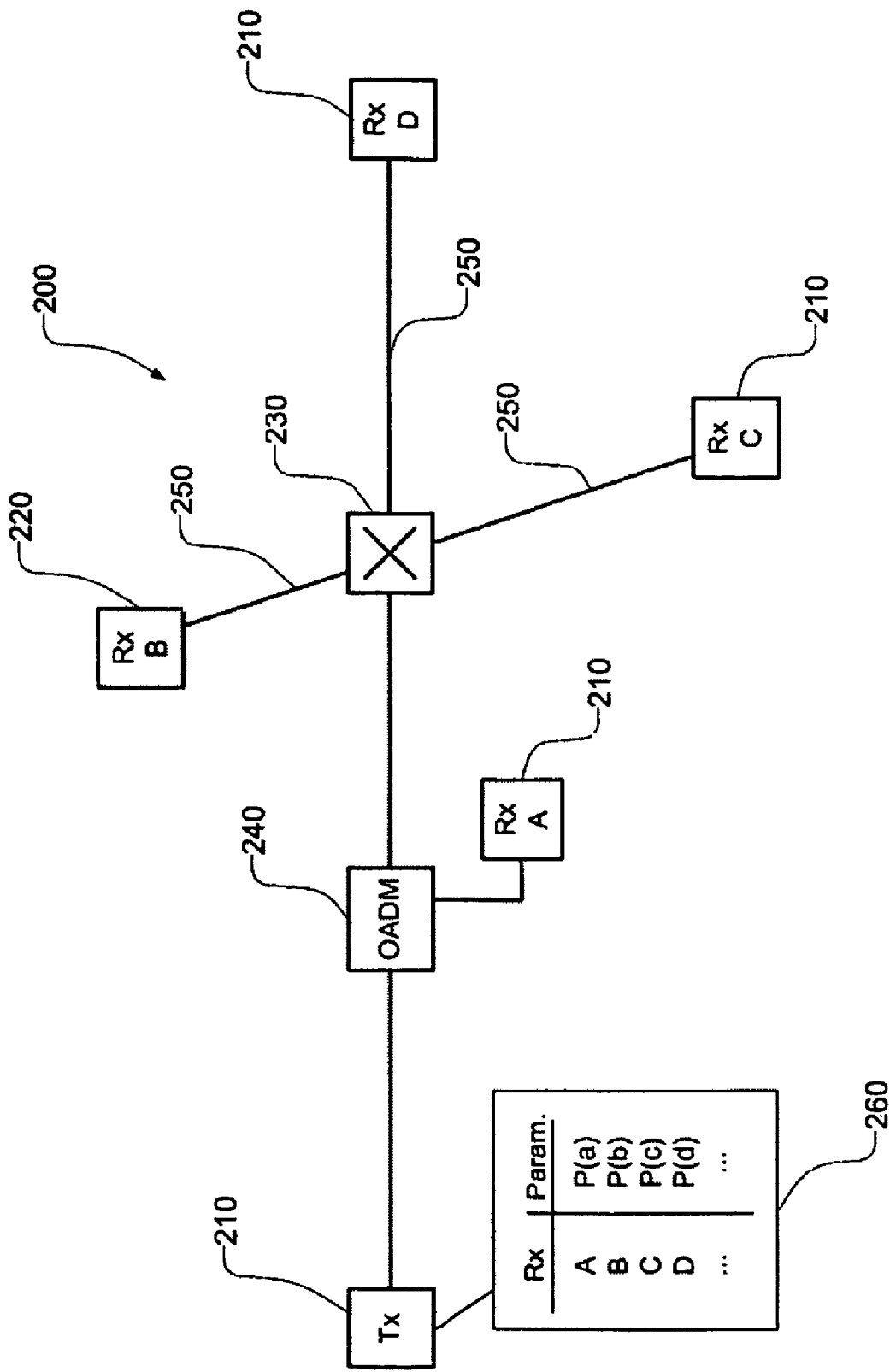
FIG. 3 is a schematic illustration of an optical network having four nodes interconnected by an optical switch wherein each node has a storage medium for storing compensation parameters for each path in the network in accordance with an embodiment of the present invention.

FIG. 3 shows a simplified optical network 200 illustrating principal elements of the present invention. For ease of description, the network 200 of FIG. 3 comprises a transmitter 210, four receivers 220, an optical cross-connect 230 and an optical add-drop multiplexer (OADM) 240, all of which are interconnected by optical links 250. The transmitter 210 is preferably constructed as described above with reference to FIG. 2. The receivers 220, OADM 240 and optical cross-connect 230 may be conventional devices known in the art.

As may be seen from FIG. 3, optical signal traffic from the transmitter 210 can be routed to receiver A via a drop-path of the OADM 240 (or other optical drop-and-continue device), and to any of receivers B, C or D via a glass-through of the OADM 240 and a wavelength switching function of the optical cross-connect 230. Accordingly, for each receiver 220, a respective path through the network 200 from the transmitter 210 can be identified, and one or more optical parameters of that path determined. The resulting table of parameters 260 can subsequently be used to enable the transmitter 210 to pre-compensate optical impairments of any desired path, and thereby enable successful communication between the transmitter 210 and a selected receiver 220. As may be appreciated, pre-compensation of optical impairments at the transmitter 210 eliminates the need for matching dispersion profiles of each link across the network. Instead, links can be allocated to a path limited only by wavelength channel availability and signal reach considerations. Furthermore, because the need for dispersion profile matching is eliminated, network designers have far greater freedom in selecting the location of wavelength switching equipment such as OADMs 240 and optical cross-connects 230.

The optical parameters can conveniently be determined during network System Layout and Test (SLAT). In some cases, direct measurement can be used to obtain the optical parameters of a path between any given transmitter/receiver pair. The parameters can be updated periodically based on a feedback signal from a respective receiver. Updating the parameters can be accomplished by computing a running average. In other cases, known physical properties of each link (e.g. optical fiber properties, amplifier performance specifications etc.) can be used to compute an estimate of the optical parameters of a path.

The optical parameters preferably reflect the optical performance of the link (dispersion as well as nonlinear effects). For example, the optical parameters may comprise any one or more of: the total chromatic dispersion; polarization mode dispersion; polarization dependent loss, and/or other optical impairments of a path. Linear and/or non-linear functions of these may also be provided. The optical parameter may be defined in terms of the magnitude of one or more optical impairments (such as a direct indication of the total path chromatic dispersion, for example), or as a term of the compensation function that will correct that impairment. In some cases, the transmitter includes a processor designed to compute updated coefficients of the compensation function C[ ], based on performance parameters obtained via a feed-back signal from a receiver. In the present invention, this functionality can be exploited by storing the optical parameters in the same format as the performance parameters expected by the processor. This arrangement is advantageous, because it leverages the existing hardware of the transmitter to enable the transmitter to be "trained" to a particular path/receiver, even before that receiver has begun receiving traffic from the transmitter.

Figure 4:
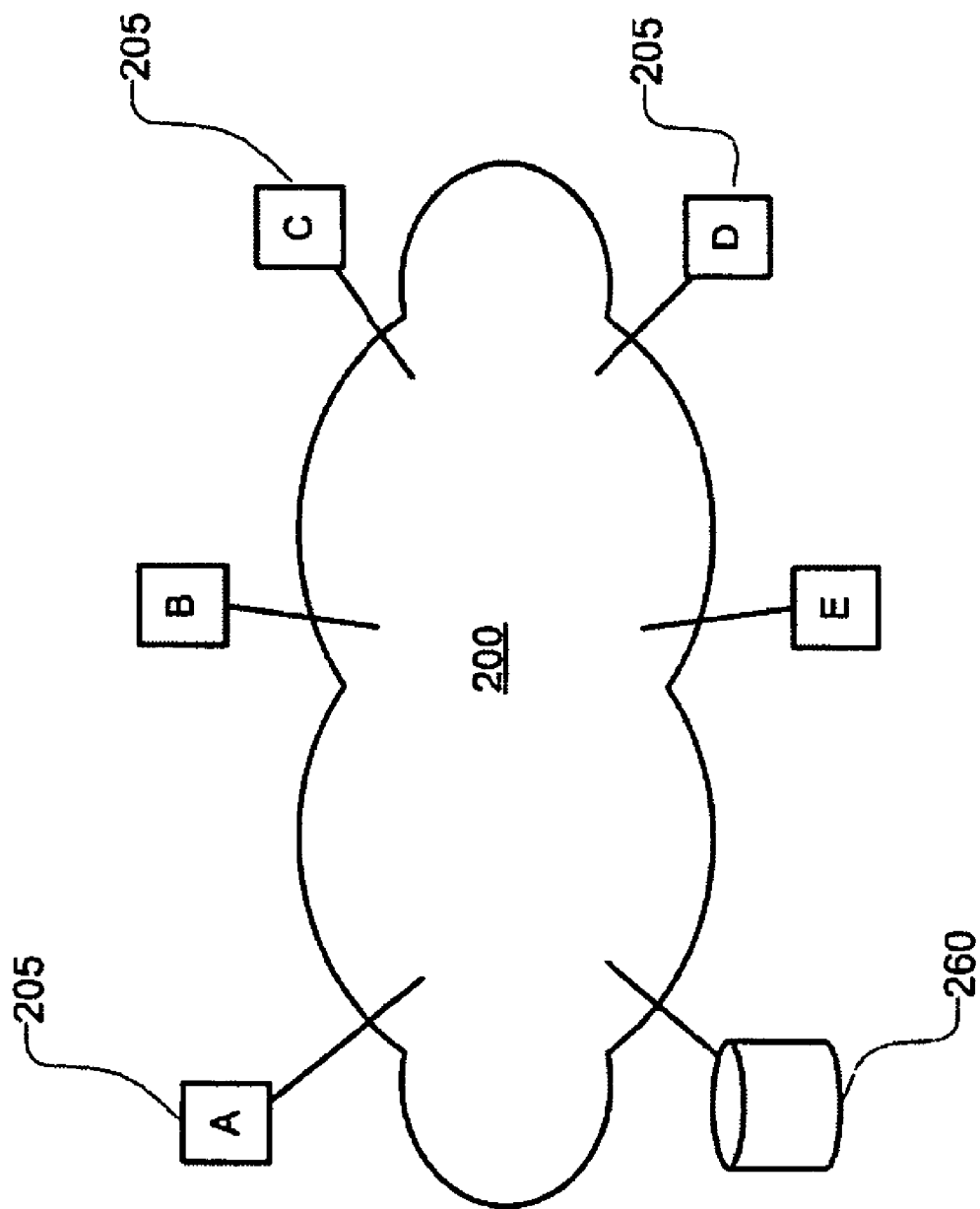
FIG. 4 is a schematic illustration of an optical network having four nodes interconnected by an optical switch wherein a central storage medium stores compensation parameters for each path in the network in accordance with another embodiment of the present invention.

FIG. 4 illustrates a generalized all-optical network 200 comprising five edge nodes (A-E) 205, each of which includes a respective transmitter 210 and receiver 220. Within the network, optical wavelength-switching equipment such as cross-connects 220 and OADMs 230 route optical signal traffic between the edge-nodes. No optical-to-electrical (O/E) conversion occurs within the network core as an aid to optical signal routing. The optical network 200 may have any desired topology, such as a star, ring or a mesh, and may incorporate legacy optical links and wavelength channel-switching equipment.

In this case, information regarding each path within the network 200 may conveniently be stored within a central database 260 or other storage medium (e.g. a look-up table), for example as part of the network control plane (not shown). In some cases, this information may include, for each transmitter: a set of receivers that can be reached (e.g. given signal reach limitations); the respective paths traversed through the network to each receiver; and the associated optical parameters of each path. Alternatively, optical parameters of each link, and possibly each piece of channel-switching equipment may be stored. When a connection between any two nodes is desired, a path between the involved nodes can be found using any suitable path-discovery protocol (such as, for example, MPLS, possibly modified to accommodate signal-reach limitations). Once a path has been allocated, the involved links (and channel-switching equipment) traversed by the path can be identified, and their respective optical parameters obtained from the database and combined to estimate the path optical parameters. The parameter estimates can then be passed to the transmitter to establish communications through the path.

If, at any time it is desired to switch traffic from one optical path to another (e.g. either for protection switching or to re-direct traffic from one receiver to another), the optical parameters of the new path can be obtained and sent to the transmitter. Upon receipt of the new parameters, the transmitter will begin retraining to the new parameter settings, a process that may take from a few 10's to a few 100's of milliseconds. Accordingly, the transmitter will begin transmitting a pre-compensated optical signal suitable for the new path, at about the same time that the involved channel switching equipment switches the optical signal over to the new path.

As may be appreciated, there may be multiple different paths having closely similar optical parameters. In such cases, it is possible to multi-cast optical traffic from one transmitter to more than one receiver. In some cases, this may be facilitated by averaging the optical parameters of each involved path, and then supplying these averaged parameter values to the transmitter. While impairment compensation using averaged parameter values will be imperfect, the signals will still be readable at each receiver provided that residual signal distortions are not excessive. As will be appreciated, robust Forward Error Correction (FEC) can also be used to compensate residual signal distortions, if desired.

In accordance with another aspect of the present invention, a method of configuring an optical signal in the all-optical network includes an initial step of identifying all optical paths between nodes 205 (i.e. for a given transmitter 210, all possible receivers are identified). Preferably, this step entails an identification of all possible paths in the network, although it may suffice in certain circumstances to merely identify a subset of all possible paths.

Once the optical paths in the network 200 are identified, respective optical parameters are determined for each path, either by calculating based on theoretical or empirically determined optical properties, by measuring optical performance characteristics (e.g. BER, dispersion, four-wave mixing, etc.) or by transmitting a probe signal during start-up. This step preferably entails storing the preconfigured parameters in one or more rapidly accessible storage media, either locally (at the node 205) or remotely (in a storage medium shared with other transmitters 210 in the network). The parameter(s) can be one or more of the following optical parameters: dispersion, dispersion slope, a linear transfer function for compensating first-order effects, and any nonlinear characteristic (e.g. Self-Phase Modulation (SPM), Cross-Phase Modulation (XMP), four-wave mixing and polarization dependent effects (PDEs) such as polarization dependent loss). The optical parameters can be either pre-computed compensation parameters (e.g. matrix values or coefficients for loading directly into a compensation function in the optical transmitter) or measured optical link characteristics (which can then be processed by the microprocessor 106 (shown in FIG. 2) to generate the compensation parameters used to generate the compensation function).

When a receiver 220 is then selected for receiving an optical signal from the transmitter 210, the optical parameters are provided to the transmitter 210 to enable the transmitter 210 to pre-compensate the optical signal. The optical parameters that are provided to the transmitter can be pre-computed compensation parameters, measured optical path characteristics, or path identifiers that enable the transmitter to download the parameters for the selected path from a storage medium 260.

Once the pre-configured parameters are provided to the transmitter, the transmitter 210 can then pre-compensate the optical signal so that when the optical signal is transmitted over the selected optical path substantially all optical impairments incurred over the path are compensated. The optical signal thus arrives at the selected receiver 220 substantially free of dispersion and other optical impairments.

By pre-determining and storing ("pre-configuring") all the compensation parameters required to fully pre-compensate any of the paths in the network, optical signals can be switched, added or dropped quickly and easily. An optical signal can be switched without OEO-regeneration or without dispersion matching because compensation parameters for every optical path in the network have been predetermined so that the transmitter merely needs to obtain the preconfigured set of compensation parameters for the selected path.

In order to perform optical switching, the method includes an additional step of enabling the transmitter to generate the optical signal using the respective optical parameter of a different path between the transmitter and a different selected receiver. In other words, the step of enabling the transmitter to generate the optical signal for pre-compensating a different path includes providing to the transmitter either (i) at least one different compensation parameter, (ii) at least one different optical path characteristic, or (iii) at least one different path identifier to enable the transmitter to pull at least one preconfigured parameter from the storage medium.

This method thereby enables switching of an optical signal from a first connection on a first path to a second connection on a second path. In other words, the first connection is broken (terminated) and a second connection is made (established) on the second path. The time elapsed between breaking the first connection and making the second connection should be less than 1 second, and preferably less than 1 millisecond.

In another embodiment, the method further include steps of selecting a second receiver for receiving the optical signal from the transmitter and then enabling the transmitter to generate the optical signal by also using the respective optical parameter of the path between the transmitter and the second receiver. This technique can be used to perform an optical broadcast.

Therefore, the embodiments of the present invention provide the basis for an all-optical network since optical-electrical-optical regeneration is no longer necessary for switching, adding or dropping optical signals between a transmitter and a receiver. Any selected path through the network (irrespective of the number or type of components along that path) can be pre-compensated by accessing preconfigured compensation parameters or optical path characteristics for the selected path.

The embodiment(s) of the invention described above is(are) intended to be exemplary only. The scope of the invention is therefore intended to be limited solely by the scope of the appended claims.

We claim:

1. A method of controlling an optical network including a transmitter including a processor for electronically compensating optical impairments based on at least one optical parameter, the method comprising steps of:
   the network preliminarily:
      identifying a respective optical path between the transmitter and each one of a plurality of receivers; and
      determining a respective optical parameter for each path; and
   during run-time, the network:
      selecting a path between the transmitter and a receiver for receiving an optical signal from the transmitter; and
      providing the respective optical parameter of the selected path to the processor of the transmitter, such that the transmitter generates an optical signal that is pre-compensated for optical impairments of the selected path.

2. The method as claimed in claim 1 wherein the optical parameter comprises either one of a magnitude of an optical impairment of the path, and a compensation function that compensates the optical impairment.

3. The method as claimed in claim 1 wherein the optical parameter comprises any one or more of: total path dispersion; a dispersion slope of the path; a linear transfer function of the path; and a nonlinear characteristic of the path.

4. The method as claimed in claim 1 wherein the step of determining a respective optical parameter for each path comprises a step of measuring a respective optical characteristic of each path.

5. The method as claimed in claim 4 wherein the step of measuring the optical characteristic comprises a step of transmitting a probe signal through the path.

6. The method as claimed in claim 4 wherein the optical characteristic comprises any one or more of: dispersion, polarization dependent loss (PDL); polarization mode dispersion (PMD); four wave mixing, cross-phase modulation (XPM); and self-phase modulation (SPM).

7. The method as claimed in claim 1 wherein the step of determining a respective optical parameter for each path comprises a step of computing an estimate of the parameter.

8. The method as claimed in claim 7 wherein the optical parameter estimate is computed based on known physical properties of the path.

9. The method as claimed in claim 7 wherein the step of computing an estimate of the parameter comprises steps of:
   preliminarily determining a respective parameter value for each link in the network; and
   during run-time:
      identifying each link traversed by the path; and
      computing the parameter value using the respective parameter values of each identified link.

10. The method as claimed in claim 1 wherein the step of determining a respective optical parameter for each path comprises a step of periodically updating the parameter based on a feedback signal from at least the selected receiver.

11. The method as claimed in claim 10 wherein the step of periodically updating the parameter comprises a step of computing a running average of the parameter.

12. The method as claimed in claim 1 wherein the step of enabling the transmitter to generate the optical signal comprises a step of providing a path identifier to the transmitter to enable the transmitter to download the respective optical parameter of the selected path from a storage medium.

13. The method as claimed in claim 1 wherein the selected receiver receives the optical signal via a wavelength selective network element.

14. The method as claimed in claim 13 wherein the wavelength selective network element comprises any one of:
   an optical switch;
   an optical add/drop multiplexer (OADM); and
   an optical drop and continue.

15. The method as claimed in claim 1, wherein respective paths between the transmitter and two or more receivers are selected, and wherein the step of providing the optical parameter to the processor of the transmitter comprises steps of:
   computing an average of the respective parameter values of each selected path; and
   providing the computed average parameter value to the processor of the transmitter, such that the transmitter generates an optical signal that is at least partially pre-compensated for optical impairments of each selected path.

16. An agile all-optical network comprising:
an optical transmitter at a first edge node of the network, the transmitter including a processor for electronically compensating optical impairments based on at least one optical parameter;
means preliminarily identifying a respective optical path between the transmitter and each one of a plurality of receivers; and determining a respective optical parameter for each path; and
during run-time, means:
  selecting a path between the transmitter and a receiver for receiving an optical signal from the transmitter; and
providing the respective optical parameter of the selected path to the processor of the transmitter, such that the transmitter generates an optical signal that is pre-compensated for optical impairments of the selected path; such that routing of optical signal traffic within the network can be performed independently of dispersion differences between respective different paths through the network.

17. The network as claimed in claim 16 further comprising at least one optical add-drop multiplexer (OADM), and wherein the path between the transmitter and a receiver traverses either one of:
  a drop-path of the OADM; and
  a node subtending a path that traverses a glass-through of the OADM.

18. The network as claimed in claim 16 further comprising at least one optical switch traversed by the path between the transmitter and the receiver.

* * * * *